Aug. 6, 1963         G. E. SONNTAG         3,100,020
              MOTOR SCOOTER HAVING REAR CASTER WHEELS
Filed March 12, 1962                        2 Sheets-Sheet 1
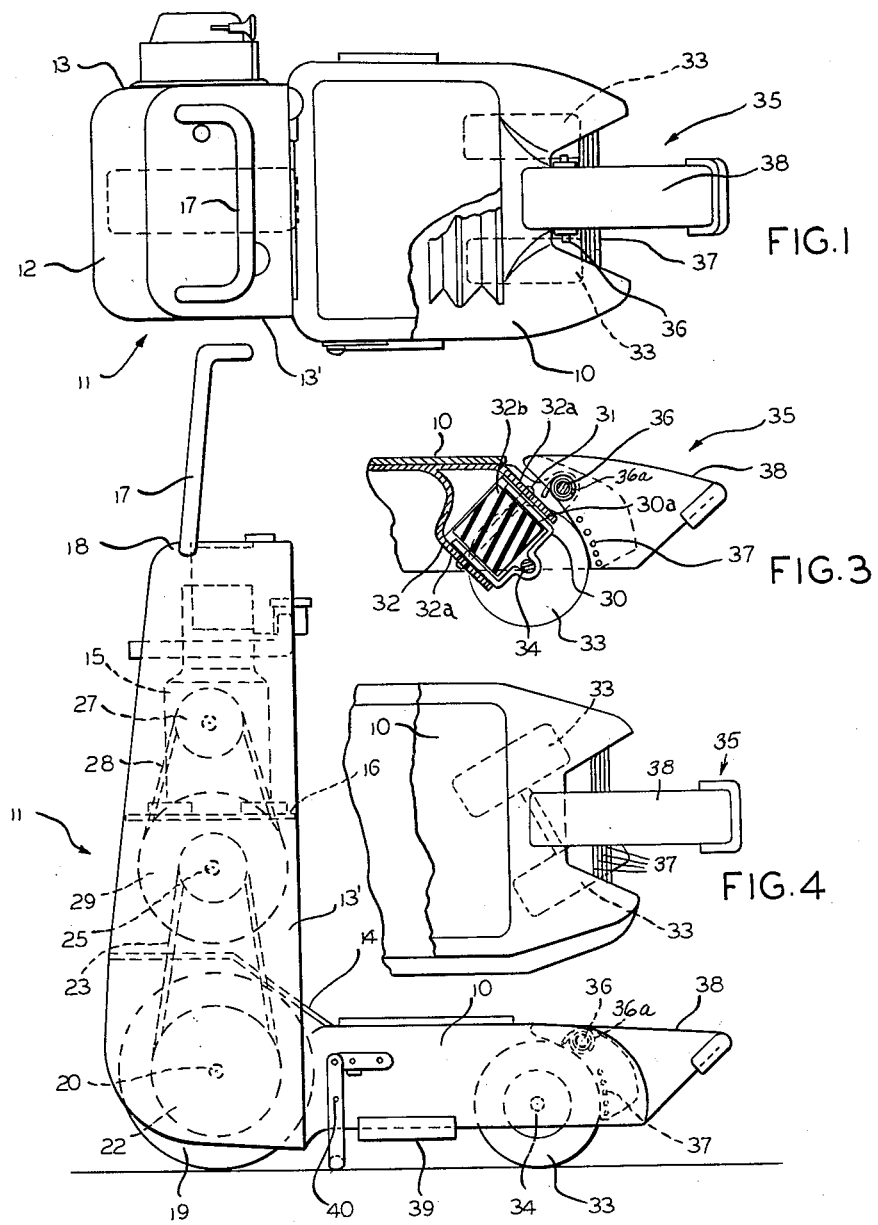
INVENTOR.
GEORGE E. SONNTAG
BY
Irwin C. Alter
ATTORNEY Aug. 6, 1963  G. E. SONNTAG  3,100,020
MOTOR SCOOTER HAVING REAR CASTER WHEELS
Filed March 12, 1962  2 Sheets-Sheet 2

*INVENTOR.*
GEORGE E. SONNTAG
*BY* Irwin C. Alter
ATTORNEY

United States Patent Office 3,100,020
Patented Aug. 6, 1963

3,100,020
MOTOR SCOOTER HAVING REAR
CASTER WHEELS
George E. Sonntag, 10555 E. Spencer Ave,
Milwaukee 23, Wis.
Filed Mar. 12, 1962, Ser. No. 179,024
2 Claims. (Cl. 180—25)

My invention relates to scooters, and more particularly to a vehicle driven by a mechanical actuating means.

The prime object of my invention is to provide a motor driven scooter, that is operated and guided in its path, by the body sway of the operator.

Another object of my invention is to provide a device of the character described that is started by raising the front wheel from the surface of the pavement.

Still another object of my invention is to provide a device equipped with means to permit the operator who is in a standing position, to unclutch the brake, or guide the vehicle in its path, by his body movement, and to permit him to pivot the vehicle by means of his body movement in a rearward position to apply the brake and raise the front wheel to eliminate traction for forward movement.

A further object of my invention is to support a pair of rearwardly disposed caster wheels in a pivoted manner to permit a side to side sway motion of the operator's body, for guiding the vehicle in its path, when the front wheel is lowered for traction with the surface of the pavement for forward motion.

A still further object is to provide a lightweight, economical power driven vehicle, that is easy to manipulate.

It is manifest to anyone familiar with automotive transportation, that there is a constant demand for motor driven units that are small and compact, for use where only short distances are to be covered in a short time, and where the use of automobiles, or even a motorcycle would not be practical. The device described herein is adaptable for use not only on a highway or road, but at air-ports, or even indoor structures, and may be manipulated by the operator by starting it in a standing position, and using his pivoted body movement for starting, stopping and steering. It has a single drive wheel in a fixed position, and its rearwardly disposed support wheels are mounted in a pivoted manner to enable the sideward movement of the operator's body to assume a radial movement, to guide the vehicle in its forward path.

Other and further objects of my invention will become more apparent as the description proceeds, when taken in conjunction with the drawings, in which:

FIGURE 1 is a top or plane view of the device constituting my invention;

FIGURE 2 is a side view of the assembled device shown in FIGURE 1;

FIGURE 3 is a fragmentary side view of the pivoted rear wheel mounting;

FIGURE 4 is a fragmentary top view projection of a portion of the body when tipped toward the left, showing the rear wheels in phantom in an angular position, as when making a right turn;

Figure 5:
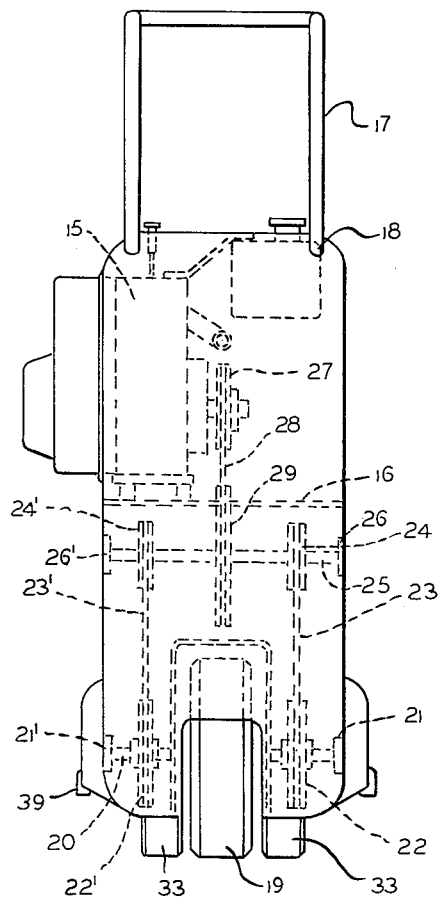
FIGURE 5 is a front view of the assembled device.
Figure 6:
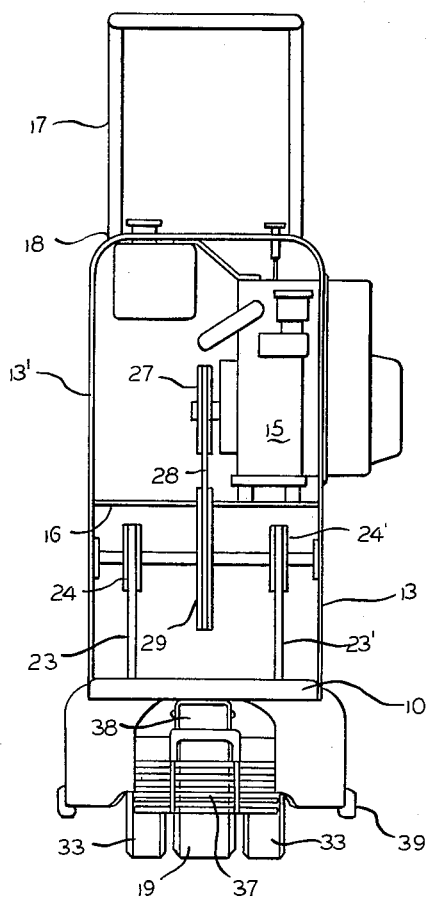
FIGURE 6 is a rear view of the assembled device.

Similar characters of reference indicate corresponding parts throughout the several views, and referring now to the same, the character 10 shows a platform, equipped with a vertical housing or enclosure 11, enclosed at its forward end 12, and having rearwardly disposed sides 13 and 13'. The enclosure 11 is attached to the platform 10 at 14. The enclosure 11 supports an internal combustion engine 15 shown mounted on to a laterally disposed shelf 16, attached to the enclosure 11, in any practical or efficient manner. The engine 15 acts as an actuating means for the entire assembly constituting my invention.

There is a handle bar means 17 attached at 18 to the upper end of the enclosure 11.

The enclosure 11 has a single wheel 19, mounted on to a shaft 20, journalled at 21 and 21' to the side members 13 and 13'. The shaft 20 is shown equipped with a pair of pulleys 22 and 22' respectively engaging a pair of pulleys 24 and 24' by means of the belts shown at 23 and 23'. The pulleys 24 and 24' are mounted on to an auxiliary shaft 25, journalled at 26 and 26' to the side members 13 and 13'. The motor 15 is equipped with a pulley 27 driving the shaft 25 by means of a belt 28, engaging a pulley 29 mounted on to the shaft 25. This assembly as described furnishes the motive power for the entire vehicle when the wheel 19 engages the surface of the pavement.

The rearward end of the platform 10 is equipped with a yoke 30 pivotally mounted at 31, and supported by a bearing 32. The bearing 32 is fixedly attached to the rearward end of the platform 10 and has a pair of fingers 32a extending downward angularly therefrom, said fingers defining a slot therebetween and extending equidistant and being disposed perpendicular with respect to an imaginary vertical plane extending through the center of said platform.

The yoke 30 has a pair of sides 30a which are received by the bearing fingers 32a as clearly illustrated in FIG. 3. When not in use, springs or a rubber spring insert 32b in the slot around the bearing 32 may be employed to tend to return the steering yoke to straight line course of motion.

An axle 34 is fixedly associated with the yoke 30 and it has a rear wheel journalled to each end thereof, said axle being disposed perpendicular with respect to the aforementioned vertical plane extending through the center of the platform 10.

A brake assembly 35 is pivotally attached to the rear end of the platform at 36 and it has a plurality of rods 37 extending laterally and being disposed in proximity to the wheels for contact therewith when pressure is applied to the upper surface 38 of the brake assembly 35, as shown in FIGURE 3. A spring 36a of any design may be associated with the brake assembly 35 to be employed as a means for returning the brake assembly 35 to a disengaged position.

The rear wheel mounting acts as an angularly castered arrangement which when the operator is supported on the platform 10 sways his body from side to side serving to guide the scooter.

The platform 10 is pivoted on the rear wheels 33, by pressure applied to the top surface 38 of the brake assembly 35 which will cause the wheel 19 to be raised from the pavement. This action can also be aided by pulling backward on the handle bar. In this position the motor is started in the conventional manner with no load, such as a recoil starter or the like.

When the operator standing on the platform 10 releases the brake mechanism, by shifting his weight to platform 10, it will permit the front wheel 19 to contact the surface of the pavement, and the device will be propelled forward, due to the motor 15 actuating the wheel 19.

The operator supporting himself by means of the handle bar 17, need only to sway his body weight to cause the wheels 33 mounted to the yoke 30 in an angularly castered fashion to assume a movement in one, or the other direction as shown in FIGURE 4, thereby causing the vehicle to be "steered" or guided in its forward path.

If desired, side skids shown as 39 may be employed for safety when making turns. A retractable stand of any design may be attached as shown in FIGURE 2, to support the vehicle with wheel 19 off the ground allowing the engine to idle when not in use.

To stop the vehicle in its forward movement, pressure on the surface 38 of the braking mechanism 35, will bring the rods 37 in contact with the outer peripheral surface of the wheels 33, performing a braking action. A backward movement of the operator's body will cause the front wheel 19 to be raised when the handle bars 17 are pulled backward, thereby performing a declutching action.

From the above description it will become manifest that the device is simple in construction, easy to manipulate, and positive in its function, and although I have shown a specific structure and arrangement of the parts constituting my invention, I am fully cognizant of the fact that many changes may be made in the form, shape, and contour of the component parts and their arrangement without effecting their operativeness and I reserve the right to make such changes as I may deem convenient or necessary without departing from the spirit of my invention, or the scope of the claims.

Having thus described my invention, what I claim and desire to secure by Letters Patent in the United States is:

1. A vehicle which can be steered by the operator by shifting his weight, comprising: a front wheel rotatively associated with a platform, mechanical means associated with said front wheel for rotatively driving said front wheel, a bearing fixedly attached to the rearward end of said platform and having fingers extending angularly downward therefrom, said fingers being disposed an equal distance on each side from the center of said platform and perpendicularly with relation to an imaginary vertical plane extending through the middle of said platform, said fingers forming a slot therebetween, a yoke having sides that are received by said bearing fingers, said yoke being pivotally mounted on said bearing in an angularly castered fashion, said sides of said yoke being adjacent to said fingers, and an axle fixedly attached to said yoke, said axle having rear wheels rotatively journalled at each end, said axle being disposed perpendicular with respect to said imaginary vertical plane.

2. A vehicle, as defined in claim 1, having a spring means inserted in said slot defined by said bearing fingers, whereby said yoke has a tendency to return to the position where said rear wheels have a straight line course of motion.

References Cited in the file of this patent

UNITED STATES PATENTS

| 321,261 | Turnbull | June 3, 1885 |
| 1,694,671 | Rodelli | Dec. 11, 1928 |
| 2,126,359 | Vogt | Aug. 9, 1938 |
| 2,474,946 | Kinslow | July 5, 1949 |
| 2,994,545 | Gass | Aug. 1, 1961 |